US005895474A

United States Patent [19]
Maarek et al.

[11] Patent Number: 5,895,474
[45] Date of Patent: Apr. 20, 1999

[54] INTERACTIVE, TREE STRUCTURED, GRAPHICAL VISUALIZATION AID

[75] Inventors: Yoelle Smadja Maarek; Pnina Vortman; Alan Jay Wecker, all of Haifa, Israel

[73] Assignee: International Business Machines Corporation, Armonk, N.Y.

[21] Appl. No.: 08/706,937

[22] Filed: Sep. 3, 1996

[30] Foreign Application Priority Data

Sep. 4, 1995 [GB] United Kingdom ............... 9517988

[51] Int. Cl.$^6$ ..................................... G06F 17/00
[52] U.S. Cl. ............................. 707/514; 345/357
[58] Field of Search ........................ 707/514, 513, 707/515, 508; 345/356, 357

[56] References Cited

U.S. PATENT DOCUMENTS

| | | | |
|---|---|---|---|
| 5,388,196 | 2/1995 | Pajak et al. | 395/153 |
| 5,606,654 | 2/1997 | Schuur | 395/140 |
| 5,675,753 | 10/1997 | Hansen et al. | 395/333 |
| 5,708,767 | 1/1998 | Yeo et al. | 395/140 |

OTHER PUBLICATIONS

"Adobe Site Mill, 2.0." (San Jose: Adobe) pp. 3–17, Jan. 1997.

C&C Information Technology Research Laboratories, NEC Corporation, "Cluster Analysis For Hypertext Systems", pp. 116–124, by Rodrigo A. Botafogo.

IEEE Transactions On Software Engineering, vol. 17, No. 8, Aug. 1991, "An Information Retrieval Approach For Automatically Constructing Software Libraries" by Yoelle S. Maarek, et al.

The Librarian's Assistant, "Automatically Organizing On–Line Books Into Dynamic Bookshelves", pp. 1–16, by Yoelle S. Maarek, et al.

Microsoft Windows, Version 3.1 "User's Guide", Chapter 4 "File Manager".

*Primary Examiner*—Joseph H. Feild
*Assistant Examiner*—Alford W. Kindred
*Attorney, Agent, or Firm*—Martin J. McKinley

[57] ABSTRACT

An interactive, tree structured, graphical visualization aid enables a user to better understand and interpret underlying structures in collections of digitally stored data elements, such as documents, programs and other data files. The visualization aid responds to user input, which directs the aid to operate in one of at least two modes. In a first mode, the visualization aid displays a graphical tree structure that includes a selected node and all branches of the selected node, including all subordinate nodes and data elements. In this first mode of operation, all data elements or documents branching either directly from the selected node or directly from subordinate nodes are displayed in the tree structure as branching directly from their respective nodes. In a second mode of operation, the visualization aid displays a graphical tree structure that includes a single group of all data elements or documents that branch either directly from the selected node or directly from subordinate nodes, but the selected node and its subordinate nodes are not displayed.

2 Claims, 8 Drawing Sheets

INTERACTIVE, TREE STRUCTURED, GRAPHICAL VISUALIZATION AID

BACKGROUND OF THE INVENTION

Applicants claim the foreign priority benefits under 35 U.S.C. 119 of U.K. Patent Application No. 9517988.3 filed Sep. 4, 1995, which is incorporated by reference into this application.

This invention relates to an interactive, tree structured, graphical visualization aid for use with digitally stored collections of data elements, such as documents, programs and other data files.

Due to the increased availability and use of CD-ROM storage media, the use of digitally stored textual matter or other information such as sound, image and video files has become more prevalent among computer users. Using modern CD-ROM technology a small number of CD-ROMs can be used to store a large collection of information. Typically, the information is organized by topic for ease of access. Thus, when producing a collection of this type, information elements must be manually gathered within clusters that deal with the same or related topics. In the case of documents or books, such clusters are sometimes referred to as bookshelves. This tedious organization task can be automated using cluster analysis techniques. Unfortunately, as described below standard numerical clustering techniques generate clustering hierarchies that are difficult to interpret for non-expert users.

A wide range of cluster analysis techniques have been developed for identifying underlying structures in large sets of objects and revealing links between objects or classes of objects. In the following, the objects to which the clustering process is applied will be referred to as information elements or data elements. There is no strict definition of a cluster, but in general terms a cluster is a group of objects whose members are more similar to each other than to the members of any other group. Typically, the goal of cluster analysis is to determine a set of clusters, such that inter-cluster similarity is low and intra-cluster similarity is high.

One well known clustering technique is the Hierarchical Agglomerative Clustering (HAC). This method takes as input a collection of objects and organizes them into a binary cluster hierarchy, or dendrogram. The key characteristic of a dendrogram is that each node represents a cluster formed by merging of the clusters which are its direct descendants in the tree. A leaf is a singleton cluster containing a single information element. Each level of the dendrogram, from the leaves to the root, forms a partition of the original set of elements.

However, making use of dendrograms to enable a user to understand the underlying structure of a collection of information elements has certain drawbacks.

First, dendrograms are difficult for users to visualize since they are laid out as trees and it is often difficult for novice users to understand that each node represents a cluster of information elements.

Secondly, dendrograms are difficult to interpret. One major weakness of numerical clustering algorithms is that clusters are defined extensively, i.e., by enumeration of their members, rather than intensively, i.e., by membership rules. In other words, the mere fact that a number of information elements have been grouped together in a cluster tells the user nothing in itself about the characteristics of the elements that have led to them being grouped in such a manner.

The problem of displaying clusters of information elements to the user has already been addressed in the past. It has been often proposed to represent the cluster information defined by the dendrogram not as a tree diagram, but in a completely different manner. One typical example is the layout proposed by R. A. Botafogo in 'Cluster Analysis for Hypertext Systems ' Proceedings of ACM SIGIR'93 (1993) (see in particular FIG. 7, p 122) that represents the pairwise similarity between documents as well as clusters as levels on a 2-dimensional space.

SUMMARY OF THE INVENTION

This invention is directed to providing a visualization aid which enables a user to better understand and interpret underlying structures in hierarchies of digitally stored information elements.

To achieve this aim, there is now provided a visualization aid for cluster hierarchies comprising: a storage device arranged to store a dendrogram including pointers to a collection of information elements stored in digital form; a display device having a display screen for displaying a representation of the dendrogram in the form of a tree diagram having a plurality of nodes; user input means arranged to receive signals from an input device connectable to the visualization aid for enabling the user to effect user input operations; wherein, in the tree diagram, at least one of the nodes of the tree can be selectably displayed in at least two modes, including a first mode in which all branches of the tree depending from the node are displayed as such and a second mode in which all the information elements to which branches depending from the node lead are indicated as a single list, the system being arranged to respond to predefined user input operation including a node selection to switch between the first and second modes.

This provides an interactive apparatus which enables an unskilled user to more easily understand and interpret a hierarchy of information elements represented in a dendrogram.

A preferred embodiment includes cursor control means for enabling a user to control the location of a cursor on the display screen; the predefined user input operation being carried out at least in part when the cursor is at or near the node. Of course, it will be understood that other user input arrangements, using for instance menu selections and/or touch-sensitive screens, would be possible.

Non-expert users have difficulty understanding that in a dendrogram, each node represents a cluster whose members are the final leaves (singleton clusters) of the node. In order to understand this, a user is enabled to "collapse" clusters. In other words, the dendrogram can be cut at specific internal nodes to obtain a list of all the members of that cluster instead of a sub-tree whose leaves are the singleton clusters.

In this approach, the dendrogram structure is not dropped, but a displayed dendrogram is made easier to visualize and interpret by making it a dynamic graphical object rather than a simple figure.

In one embodiment, the dendrogram is laid out as a tree in which each node is pictured as a square representing a cluster. Advantage is taken of the particular structure of dendrograms in order to allow users not only to get information about each cluster but also to manipulate the tree layout interactively. A window-based apparatus is used to represent such a tree. Each node is associated with a graphical object (e.g. widget, control) responding to mouse actions.

Thus, an apparatus is provided specifically designed for assisting in the interpretation of cluster hierarchies of documents via dynamic interaction.

This arrangement enables the user to interact with the dendrogram and to modify its shape for better visualization and to obtain interactively additional information, such as cluster or document attributes, that might have been computed independently of the HAC method.

This improves the users ability to discover and understand the structure of the collection of information elements without overwhelming the user with too much information or unnecessarily cluttering the display screen.

Viewed from another aspect, the invention provides a method for operating a computer to display a stored dendrogram including pointers to a collection of information elements stored in digital form, the computer comprising user input means for enabling the user to effect user input operations, the method comprising the steps of: displaying the dendrogram in a first mode as a tree diagram having a plurality of nodes in which all branches of the tree depending from at least one of the nodes are displayed as such; and responding to predefined user input operation including a node selection to display the dendrogram in a second mode in which all the information elements to which branches depending from said node are indicated as a single list.

DESCRIPTION OF THE ILLUSTRATIVE EMBODIMENTS

Figure 1:
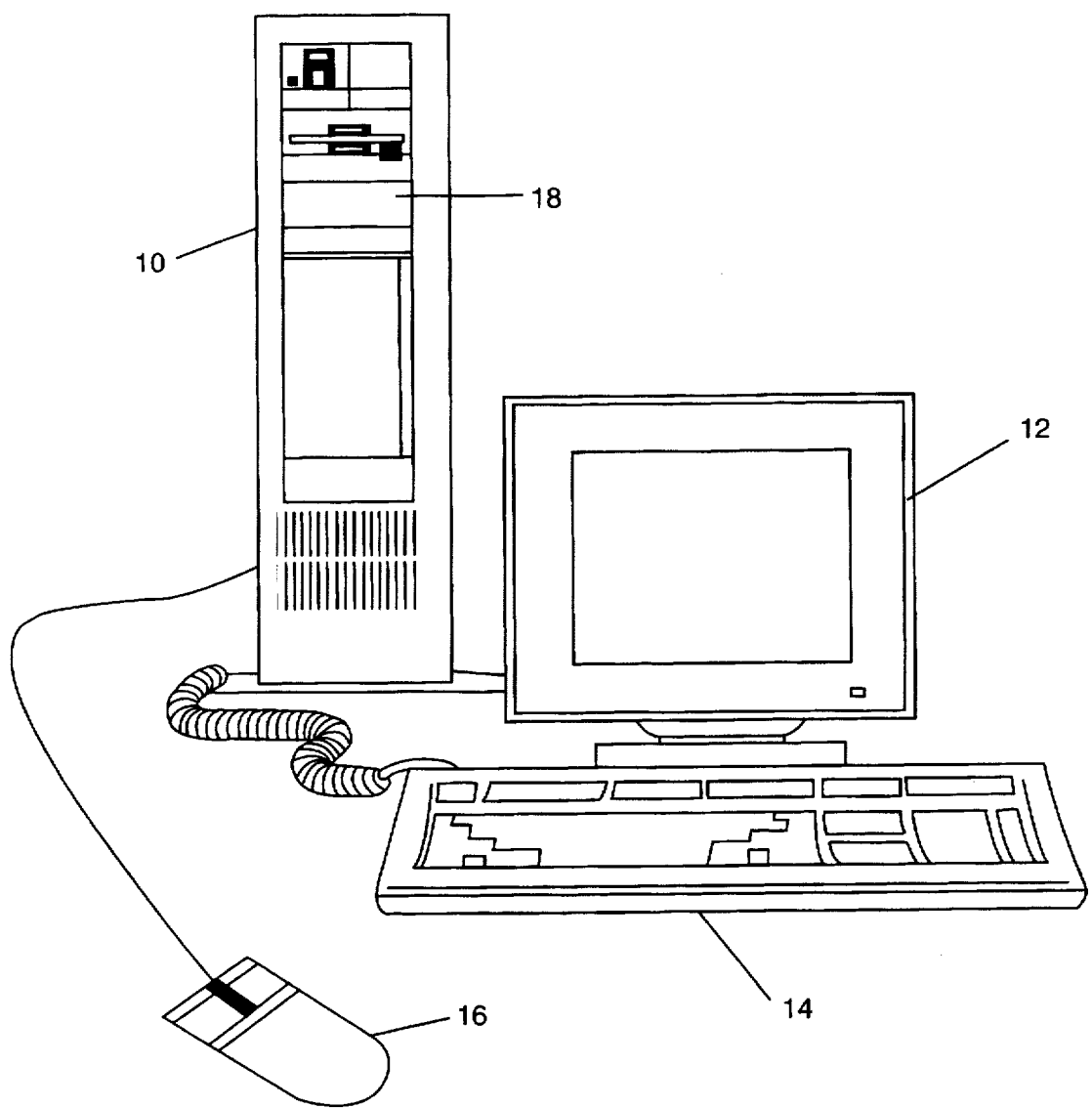
FIG. 1 is schematic diagram of a data processing system.

FIG. 1 is a schematic diagram of a data processing system which comprises a visualization aid for cluster hierarchies. It shows a general purpose computer workstation of the type well known in the art having a system unit 1 0, a display screen 12, keyboard 14 and a mouse 16. System unit 10 includes a disk data storage device 18 in which are stored various system and application programs and data used within the workstation.

The computer workstation illustrated in FIG. 1 includes a graphical user interface. As is conventional, the graphical display on display screen 12 is arranged to resemble a single desktop and execution of an application program involves one or more user interface objects represented by windows and icons. Typically, there may be several windows and icons simultaneously present on the desktop and displaying information that is generated by different applications.

The window environment is generally part of the operating system software that includes a collection of utility programs for controlling the operation of the computer system. The operating system, in turn, interacts with application programs to provide higher level functionality, including a direct interface with the user. Specifically, the application programs make use of operating system functions by issuing task commands to the operating system which then performs the requested task. For example, an application program may request that the operating system display certain information on a window for presentation to the user.

A window manager program is generally responsible for managing the windows that a user views during operation of the application programs of the computer. That is, it is generally the task of the window manager to keep track of the location and size of the window and window areas which must be drawn and redrawn on the desktop. The window manager is generally well-known and is incorporated in commercially available graphical user interface environments. The window manager is typically located in an operating system which may be executing simultaneously with the application programs on the computer system. In order to display information on a computer screen, application programs generate and send display requests to the window manager which, in turn, interfaces directly with a screen buffer. The content of the screen buffer is then provided to the display screen 12.

In this particular embodiment, the invention has been implemented using an application program which is written in the C programming language. The program is compiled and run on one of the IBM RISC System/6000 series of computer workstations using the IBM AIX Version 3.2 operating system and the IBM AIXwindows Environment graphical user interface program which includes the OSF/Motif widget set.

In the following, the system will be described largely in terms of its function as is conventional in the computer software field. It will be clear to the skilled person from what follows how the computing environment referred to above may be programmed to obtain the functions described. It will be understood that, in other embodiments of the invention, specialized hardware may be used to implement some or all of the system described below. It will be also understood that the computer system could be a single user or a multi-user system. Furthermore, in the above described computing environment, the application program need not run on the same computer workstation as the user interface program which controls the information displayed to the user, but rather they could run on separate computers linked via a local area or wide area network in a client/server arrangement.

In this example the information elements considered are documents. A collection of such documents is stored as a collection of data files in a suitable format in data storage device 18. Also stored in storage device 18 is a dendrogram which includes a set of pointers to the documents, e.g. file names or the like. The dendrogram is a data structure representing a set of documents as a hierarchy of partitions; the coarsest partition being the original set (the root of the hierarchy) and the finest, the set of singleton clusters, where each cluster contains only one document.

The structure has a plurality of nodes, each node representing a cluster of documents and containing pointers to nodes further down the tree, which ultimately lead to the documents making up the cluster.

It will be understood that, in other embodiments, the information elements could equally be other types of stored data, such as images, sound files and video information.

The document clusters can be generated in any known way, either manually or using an automated method, such as that described in the articles by Y. S. Maarek, D. M. Berry, G. E. Kaiser, 'An Information Retrieval Approach for Automatically Constructing Software Libraries', Transactions on Software Engineering Vol 17 No 8, (1991).

The specific clustering techniques used in the present embodiment are described in detail in the article 'The Librarian's Assistant: Automatically organizing online books into dynamic bookshelves' Y. S Maarek and A J Wecker, in the proceedings of RIAO'94, NY (1994) which is herein incorporated by reference.

Figure 2:
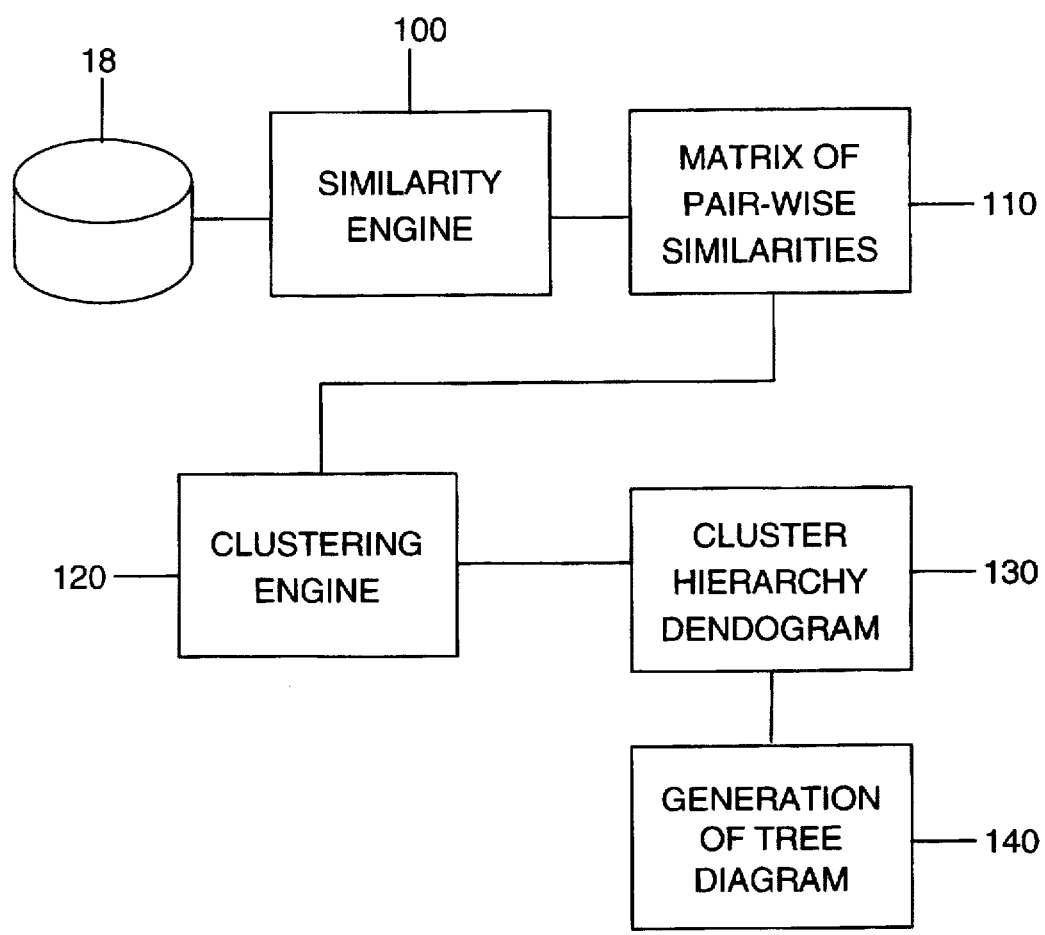
FIG. 2 is a schematic diagram showing the main steps performed in cluster generation.

A schematic diagram showing the general steps performed in this clustering process is shown in FIG. 2. As described, a set of documents is stored in storage device 18. These documents are compared by similarity engine 100 one with another to generate a similarity measure for each pair of documents in the collection. Thus a matrix of pair-wise similarity values, designated 110 in FIG. 2, is generated and stored.

A clustering engine 120 generates a cluster hierarchy using the Hierarchical Agglomerative Clustering method. The HAC method can be described briefly as follows. Given a set of documents:

(I) start with a set of singleton clusters;
(ii) repeat the following steps iteratively until there is only one cluster:
   identify the two clusters that are the most similar using the matrix of pairwise similarities;
   merge the two clusters together into a single cluster;
   update the similarity matrix.

The result of this process is a dendrogram in the form of a tree data structure, designated 130 in FIG. 2. From this data structure a tree diagram is generated 140 and stored in a display buffer for display on display device 12.

Figure 3:
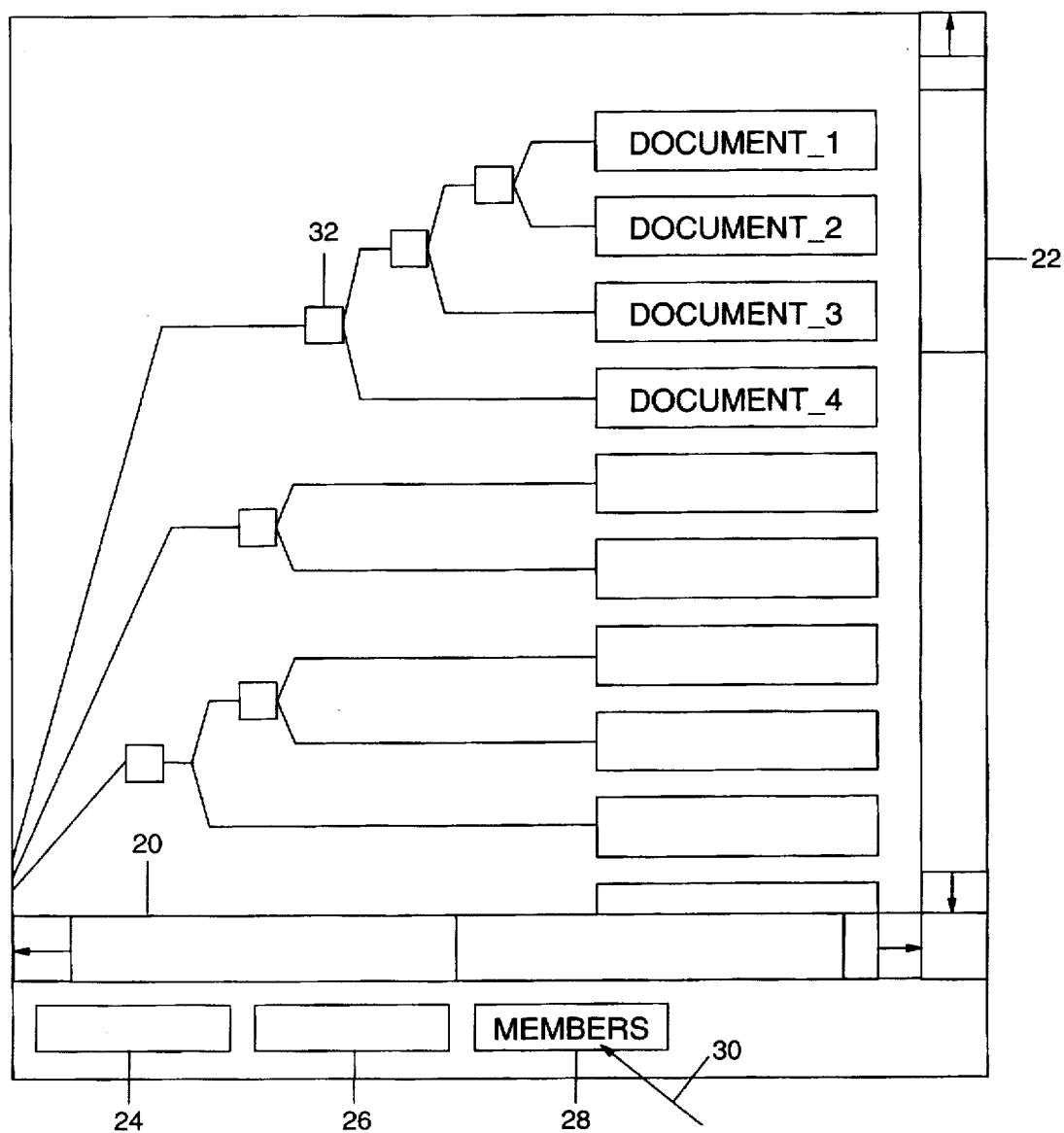
FIG. 3 shows a displayed dendrogram in a first mode.

As is described in the above referenced article the dendrogram is displayed and modified in a window on the display screen in the form of a tree diagram. An example of such a window is shown in FIG. 3. The window has the conventional features of horizontal and vertical scroll bars 20 and 22 and a number of pushbuttons 24, 26 and 28. The pushbuttons can be actuated in conventional fashion to execute certain functions by pressing a mouse button when a cursor 30 is located over the pushbutton. Similarly, scroll bars 20, 22 are used in conventional fashion to alter the portion of the diagram which is displayed in the window.

The dendrogram is made up of a number of selectable objects—nodes and leaves. The leaves represent the documents of the collection and the title of the document can be displayed as shown with respect to documents 1–4 in FIG. 3. A document can be selected in the normal way by clicking a mouse button when the cursor is located over the document on the screen representing the document. Once selected, a function associated with a document, such as a browse operation can be initiated by clicking the mouse over the respective pushbutton.

Within the dendrogram, nodes such as node 32, are also selectable objects and once a node is selected a number of related functions can be executed using the pushbuttons.

Figure 4A:
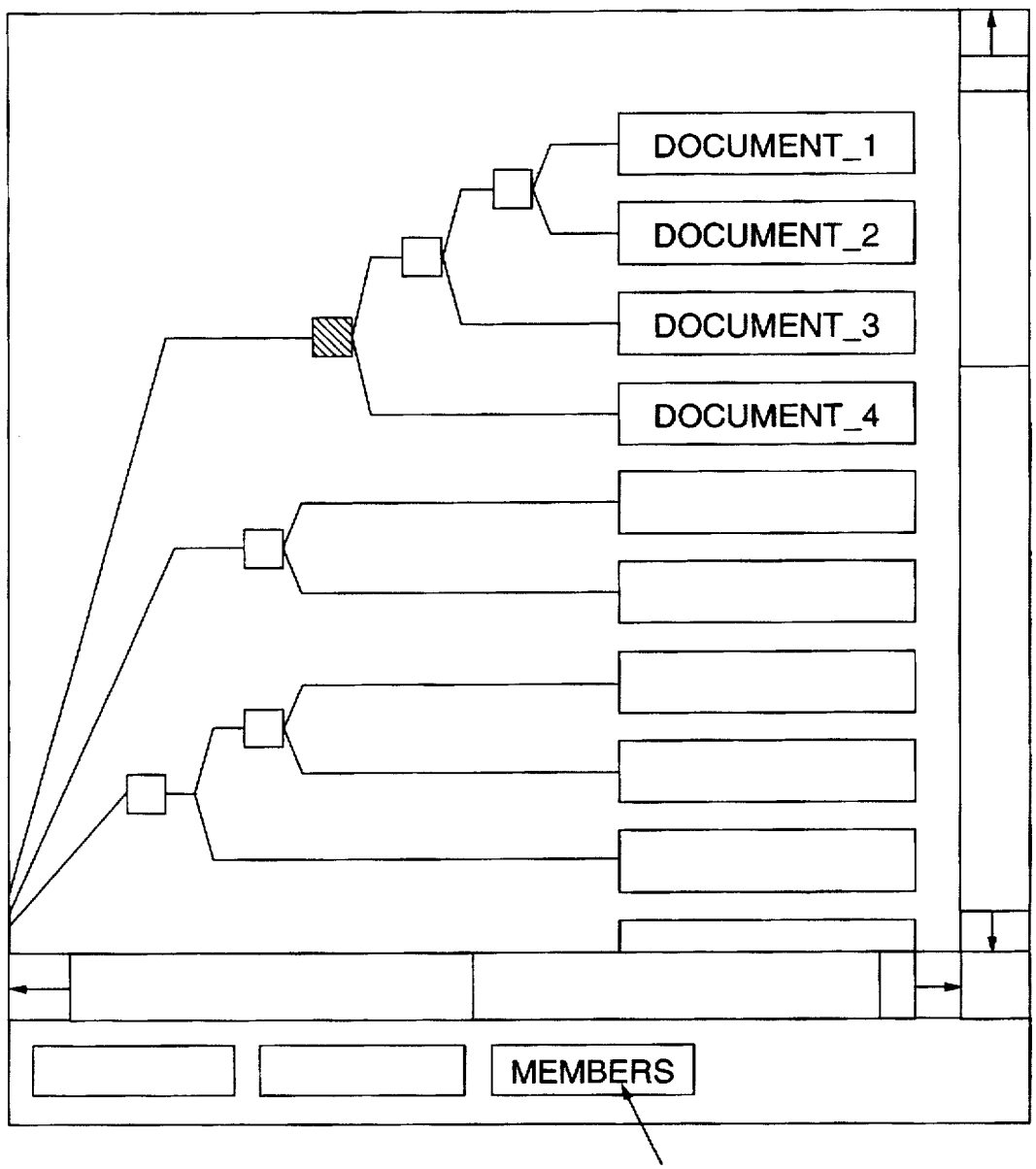
FIGS. 4A to 4D illustrate switching between the first and second display modes.

In particular, each node can be displayed in one of two modes. The first mode is shown in FIG. 3 and FIG. 4A. In this first mode the sub-tree that depends from the node is displayed, i.e., the node is shown connected by one or more branches to other nodes or to leaves.

Figure 4B:
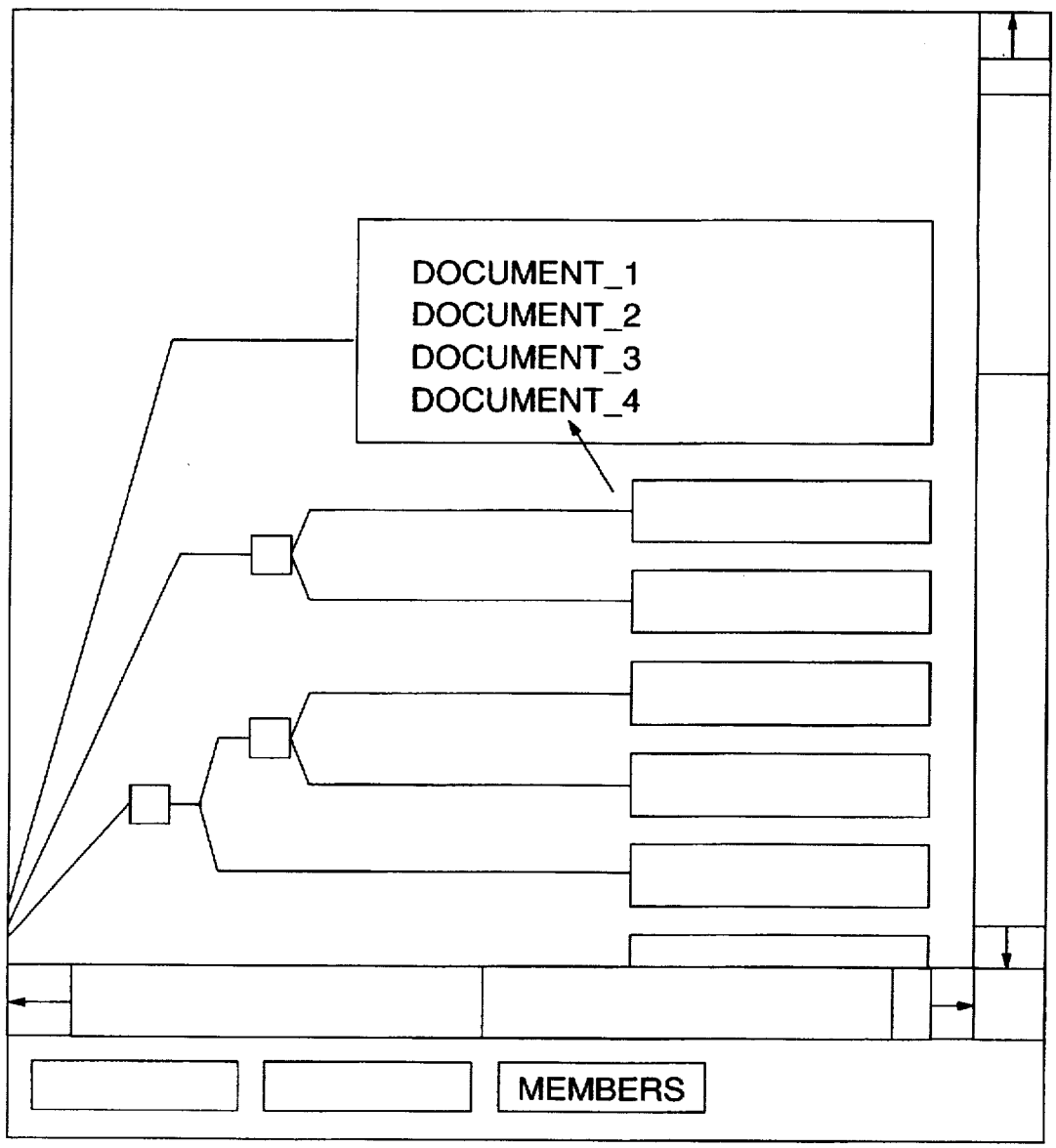

The second mode is shown in FIG. 4B. In this second mode, the node is shown as a list of the titles of all the documents making up the cluster represented by the node.

Figure 4C:
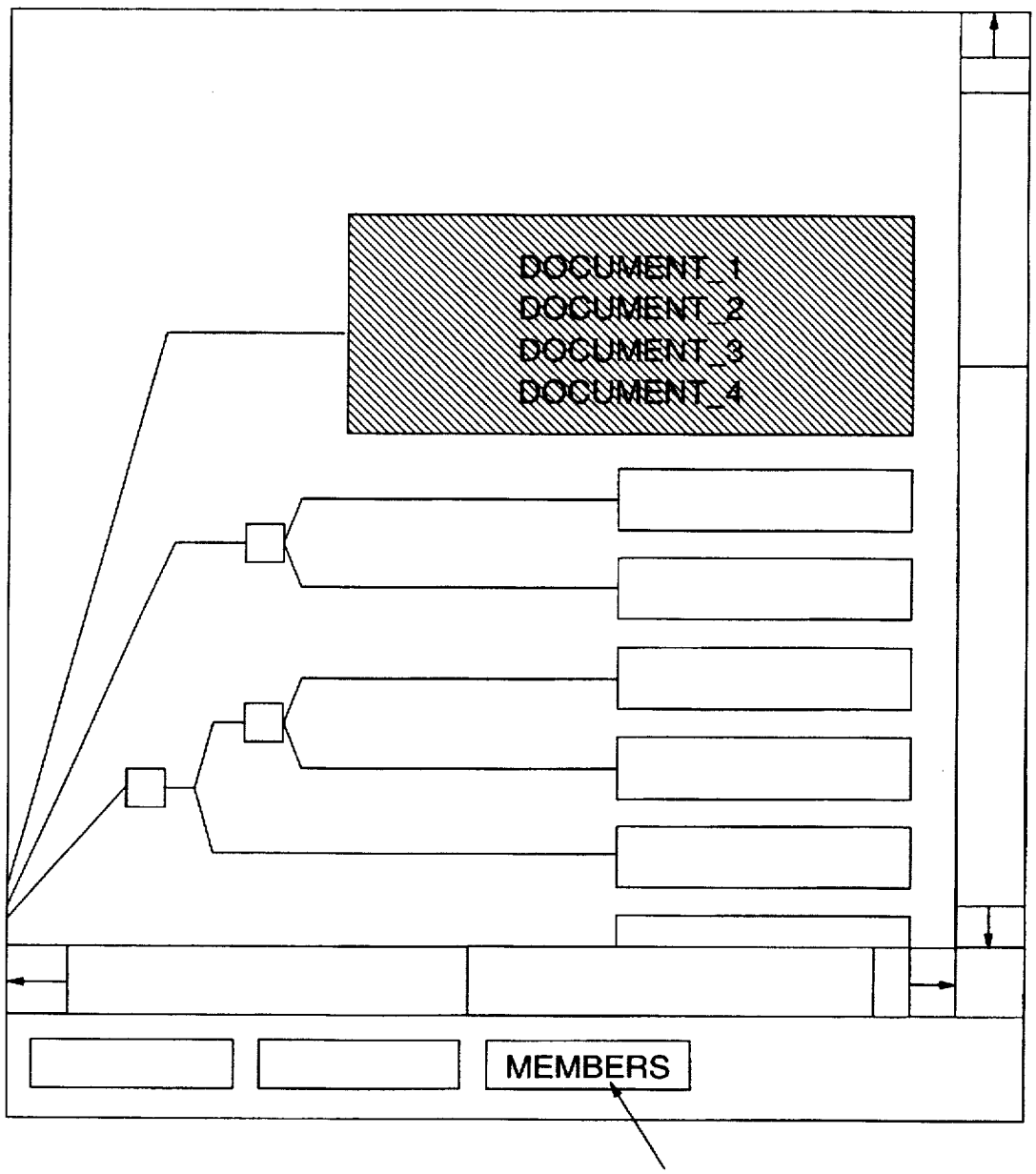
Figure 4D:
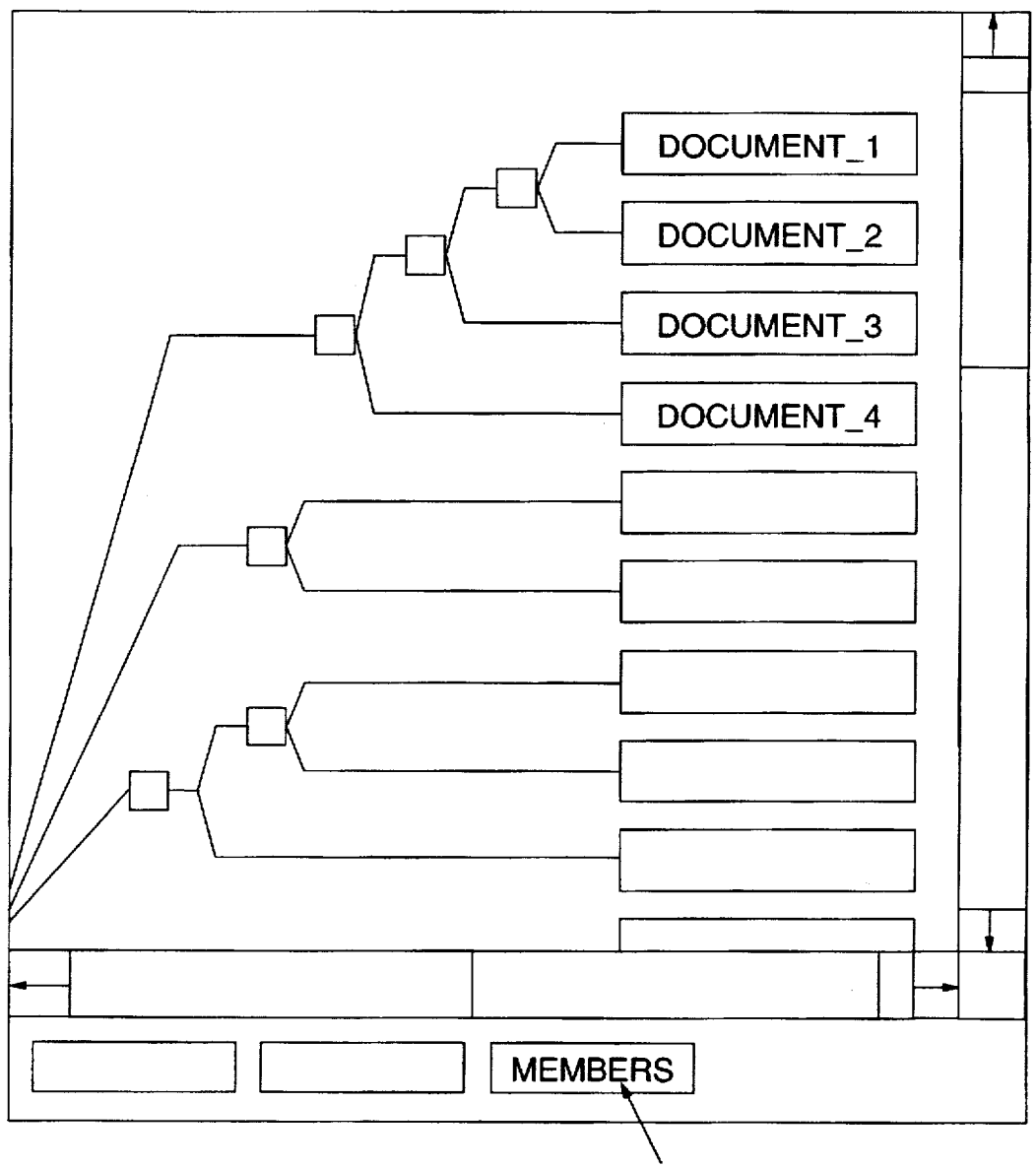

The switching between two nodes is illustrated by the sequence shown in FIGS. 4A–4D. First, the node concerned is selected by clicking on it as shown in FIG. 4A. The node is then displayed in a different color as is conventional to indicate that an object has been selected. The mode is changed by clicking on a 'members' pushbutton. The result of clicking on the members pushbutton is shown in FIG. 4B. Selecting the node and clicking again on the 'members' pushbutton causes the system switch back to the first mode as shown in FIGS. 4C and 4D.

Figure 5:
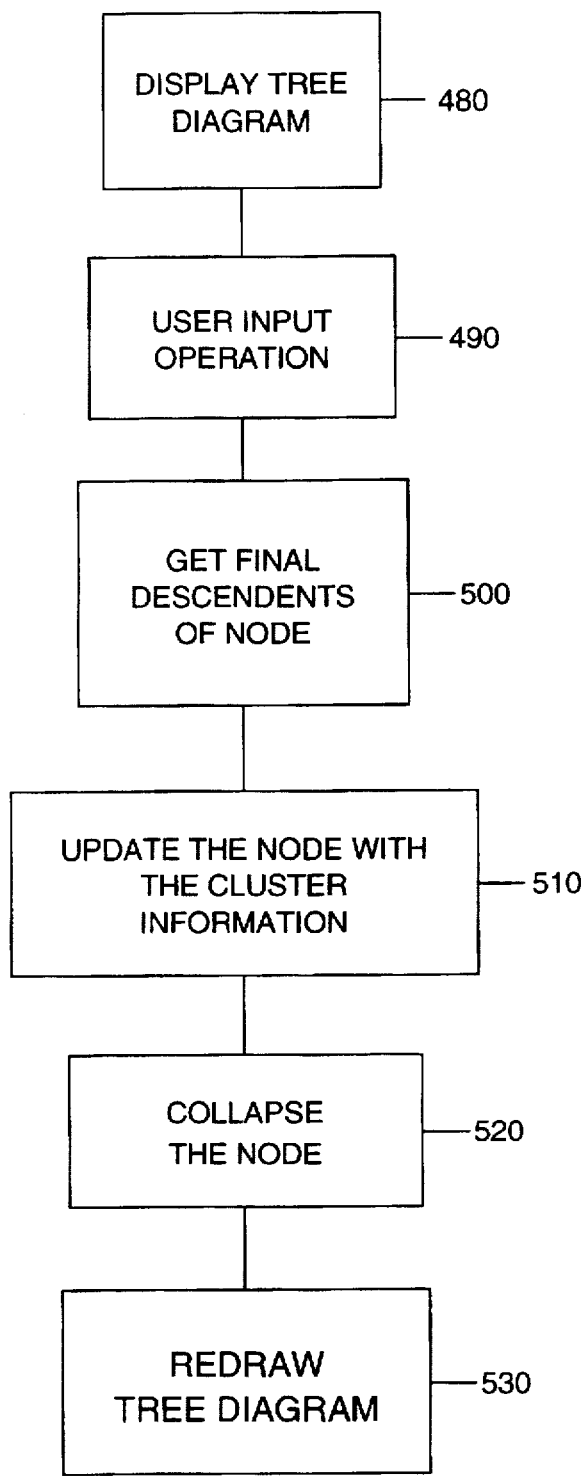
FIG. 5 is a flow diagram showing the process steps when a node is collapsed.

A schematic flow diagram showing the processing steps carried out to collapse a node is shown in FIG. 5. Initially the tree diagram is displayed in step 480 in a first mode as a tree diagram having a plurality of nodes in which all branches of the tree depending from at least one of the nodes are displayed as such.

In response to a user input operation—step 490—i.e., when a particular node is selected and the 'members' button is clicked the dendrogram is searched to find the final descendants of the selected node in step 500. The selected node is then updated with the cluster information, i.e., the names of the final descendants in step 510. The node is then marked as collapsed in step 520 so that the links to the nodes lower down the tree are not displayed. Finally the tree diagram is redrawn in step 530 with the collapsed node represented as a label which includes a single list of all the members of the cluster, indicated by their titles.

Therefore, by clicking on a mouse button while being on a node, the user changes the layout. The empty square that represents a nodelcluster is replaced by a larger square that contains the list of all the node members. Edges towards descendant clusters are cut, and a more compact hierarchy is redrawn. Re-clicking on the same node, allows the hierarchy to resume its initial shape.

Collapsing clusters in this way allows to reduce the size of the hierarchy at chosen locations, and to ease the visualization effort by reducing clutter on the screen.

It will be noted that using an object-oriented representation is particularly suitable for this context. Each node is an object with its own attribute display operations. For instance, the collapse operation is meaningless when applied to leaves and should be disabled. On the other hand, leaves correspond to singleton clusters, each containing a document. Therefore, leaves should always have as attribute the contents of the documents themselves.

In summary, in the present approach, dendrograms are not provided as static pictures, but as graphical objects with which the user can interact. The graphical object can be modified and even corrected to ease visualization in ways that are specific to cluster hierarchies. Moreover, because of the specific nature of documents, unlike other objects in cluster analysis, conceptual information can be added to the cluster hierarchy that helps interpreting the collection as well as its component clusters.

There has been described a method for facilitating the visualization of cluster hierarchies of documents. The visualization of dendrograms is facilitated by allowing is the user to dynamically interact with the hierarchy.

What is claimed is:

1. A tree structured, graphical visualization aid for use with data elements that have been organized into a hierarchy, said visualization aid having two modes of operation, wherein:

in a first mode of operation, said visualization aid causes first, second and third nodes, and first and second data elements to be displayed in a graphical tree structure, wherein said first data element branches directly from said first node, said first node and said second data element branch directly from said second node, and said second node branches directly from said third node; and in a second mode of operation, said visualization aid causes said third node and said first and second data elements to be displayed in a graphical tree structure, wherein said first and second data elements are grouped in a list that branches directly from said third node.

2. A data processing system, comprising:

a storage device for storing information, including first and second data elements that have been organized into a hierarchy;

a display device for displaying graphical information;

an input device for providing user input; and a visualization aid coupled to said display device for displaying a tree structured, graphical representation of the information stored in said storage device, said visualization aid having first and second modes of operation, each one of said first and second modes of operation being selected in response to a different predetermined input from said input device, wherein:

in said first mode of operation, said visualization aid causes first, second and third nodes, and said first and second data elements to be displayed in a graphical tree structure, wherein said first data element branches directly from said first node, said first node and said second data element branch directly from said second node, and said second node branches directly from said third node; and in a second mode of operation, said visualization aid causes said third node and said first and second data elements to be displayed in a graphical tree structure, wherein said first and second data elements are grouped in a list that branches directly from said third node.

\* \* \* \* \*